(12) United States Patent
Betz et al.

(10) Patent No.: US 10,343,646 B2
(45) Date of Patent: Jul. 9, 2019

(54) REINFORCEMENT PART FOR A BELT SHAFT, BELT SHAFT, AND END-FITTING TENSIONER

(71) Applicant: TRW AUTOMOTIVE GMBH, Alfdorf (DE)

(72) Inventors: Hans-Peter Betz, Böbingen (DE); Dominik Seitzer, Waldstetten (DE); Michal Kacprzak, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 187 days.

(21) Appl. No.: 15/502,238

(22) PCT Filed: Jul. 23, 2015

(86) PCT No.: PCT/EP2015/001524
§ 371 (c)(1),
(2) Date: Feb. 7, 2017

(87) PCT Pub. No.: WO2016/023614
PCT Pub. Date: Feb. 18, 2016

(65) Prior Publication Data
US 2017/0240136 A1    Aug. 24, 2017

(30) Foreign Application Priority Data
Aug. 15, 2014  (DE) ........................ 10 2014 011 966

(51) Int. Cl.
*B60R 22/34* (2006.01)
(52) U.S. Cl.
CPC ...... *B60R 22/34* (2013.01); *B60R 2022/3427* (2013.01)

(58) Field of Classification Search
CPC ....... B60R 22/34; B60R 22/46; B60R 22/195; B60R 2022/3427
(Continued)

(56) References Cited

U.S. PATENT DOCUMENTS 3,550,875 A * 12/1970 Settimi ................. B60R 22/353
                                                           242/382.1
3,695,546 A * 10/1972 Takada ................ B60R 22/3408
                                                           242/385.4
(Continued)

FOREIGN PATENT DOCUMENTS

DE     2163788 A1 *  7/1973  ............. B60R 22/34
DE     2704084 A1 *  8/1977  ............. B60R 22/34
(Continued)

*Primary Examiner* — Keith J Frisby
(74) *Attorney, Agent, or Firm* — Tarolli, Sundheim, Covell & Tummino LLP

(57) ABSTRACT

A reinforcing member (36) for a belt shaft (10) comprises an elongate central portion (46) and two hooking portions (48) provided at the ends of the central portion (46) adapted to be hung into a hooking slit of a belt shaft body (28) of a belt shaft (10), wherein the central portion (46) includes a retaining portion (50) adapted to be encompassed by the webbing (26) and a supporting portion (58) extending in the longitudinal direction (L) substantially over the entire central portion (46) and being offset relative to a plane (M) which is defined by the retaining portion (50), and wherein retaining lands (60) defining a passage window (62) for the webbing (26) extend between the supporting portion (58) and the retaining portion (50). The invention further provides a belt shaft (10) comprising a belt shaft body (28) as well as an end fitting tensioner (12).

16 Claims, 14 Drawing Sheets

(58) Field of Classification Search
USPC .......... 280/806, 807; 242/613.4, 613.5, 376, 242/587.1, 587.2, 587.3; 297/474, 475
See application file for complete search history.

(56) References Cited

U.S. PATENT DOCUMENTS

| | | | |
|---|---|---|---|
| 4,119,281 A | 10/1978 | Paitula et al. | |
| 4,228,970 A * | 10/1980 | Morinaga | B60R 22/405 242/383.5 |
| 4,305,554 A * | 12/1981 | Anderson | B60R 22/44 242/376 |
| 4,509,707 A * | 4/1985 | Ernst | B60R 22/36 242/376.1 |
| 4,562,977 A * | 1/1986 | Hollowell | B60R 22/353 242/382.1 |
| 4,623,104 A * | 11/1986 | Mori | B60R 22/34 242/376 |
| 5,452,863 A * | 9/1995 | Hardy, Sr. | B60R 22/34 242/376 |
| 5,820,058 A * | 10/1998 | Hirzel | B60R 22/34 242/379.1 |
| 6,202,957 B1 | 3/2001 | Bannert et al. | |
| 6,405,962 B1 * | 6/2002 | Hirase | B60R 22/3413 242/379.1 |
| 8,727,257 B2 * | 5/2014 | Dahlquist | B60R 22/3413 242/379.1 |
| 2014/0265517 A1 | 9/2014 | Betz et al. | |

FOREIGN PATENT DOCUMENTS

| | | | | |
|---|---|---|---|---|
| DE | 10238924 A1 | * | 3/2004 | ............ B60R 22/34 |
| EP | 0768219 A1 | * | 4/1997 | ......... B60R 22/3413 |
| FR | 1405634 A | * | 7/1965 | ............ B60R 22/26 |

* cited by examiner

REINFORCEMENT PART FOR A BELT SHAFT, BELT SHAFT, AND END-FITTING TENSIONER

RELATED APPLICATIONS

This application corresponds to PCT/EP2015/001524, filed Jul. 23, 2015, which claims the benefit of German Application No. 10 2014 011 966.1, filed Aug. 15, 2014, the subject matter of which are incorporated herein by reference in their entirety.

BACKGROUND OF THE INVENTION

The invention relates to a reinforcing member for a belt shaft, a belt shaft as well as an end fitting tensioner comprising such belt shaft.

A seat belt by which a vehicle occupant is restrained in an automotive vehicle, if necessary, can be wound onto the belt shaft. The belt shaft is arranged in a belt winder that may be configured in two variants.

In a first variant the belt winder is an end fitting on which the webbing is arranged and in which the belt shaft does not rotate in the normal state. Only when belt tensioning is to be performed, is the belt shaft rotated about several revolutions in a winding direction so as to remove the belt slack from the seat belt.

In a second variant, the belt winder is a belt retractor in which the belt shaft is rotatably mounted. The length of webbing required for fastening the seat belt, for example, can be wound off the belt shaft, and during unbuckling the webbing is rewound. In addition, also in the belt retractor a belt tensioner may be integrated so as to tension the seat belt if necessary. Belt shafts for belt retractors usually have a definitely larger diameter than those for end fittings.

Such belt shaft is known, for example, from DE 10 2011 117 052 A1. This belt shaft includes a body into which the reinforcing member may be hung. The body includes two flanges which are connected to a land for bearing the belt shaft. Between the flanges a recess for receiving the reinforcing member is formed. Hooking silts for hooking portions of the reinforcing member are provided at each of the flanges.

The webbing may be slipped onto the reinforcing member and, resp., a retaining portion of the reinforcing member by a sewn eye so that the webbing is safely fixed to the reinforcing member. Subsequently, the reinforcing member is hung into the hooking slits of the body. This design facilitates simple fastening of the webbing.

The known reinforcing members consist of a substantially planar sheet metal part for reasons of costs. When the webbing is wound, the webbing first wraps the land of the body and is supported by the same. The load transfer from the webbing thus is performed via the hooking slits and the land to the body. Due to the geometry of the land and, resp., the reinforcing member, a strongly irregular load, especially bending stresses, of the body and the reinforcing member are entailed. In addition, when a straight sheet metal part is used as a reinforcing member, the belt shaft is not completely round so that imbalance may occur when the webbing is wound.

SUMMARY OF THE INVENTION

It is the object of the invention to provide a reinforcing member for such belt shaft as well as a belt shaft which allows for better load distribution and thus exhibits better stability. It is a further object of the invention to provide an end fitting tensioner comprising such belt shaft.

For achieving the object a reinforcing member is provided for a belt shaft, comprising an elongate central portion and two hooking portions provided at the ends of the central portion which can be hooked into a slit of a webbing shaft, wherein the central portion includes a retaining portion adapted to be encompassed by the webbing and a supporting portion extending in the longitudinal direction substantially over the entire central portion and being offset relative to a plans defined by the retaining portion. Retaining lands defining a passage window for the webbing extend between the supporting portion and the retaining portion.

In accordance with the invention, the reinforcing member rests on the body not only by the flanges and, resp., the hooking slits but by the appropriately modified geometry of the reinforcing member also directly on the land interconnecting the flanges of the body. The support on the body thus is performed over the entire width of the belt shaft so that bending of the reinforcing member or the land can be reduced. Preferably the support is performed by the supporting portion on the land opposed to the area of the land which is first wrapped by webbing during winding so that no or merely low bending forces act on the land by the forces acting in the opposite direction. The additional support of the reinforcing member by the supporting portion thus provides altogether belter distribution of the load transfer to the body so that less punctual load is transferred to the latter.

The reinforcing member is formed, for example, in one piece from a bent sheet metal part by bending and/or folding. Especially the retaining portion may be double-layered. By appropriate rounded portions of the individual layers and, resp., the distance of the layers from each other the retaining portion may be designed to be more stable, for example. Appropriate rounded portions may also reliably prevent sharp edges on the retaining portion so that the load acting on the webbing may be reduced. In addition, such double-layered retaining portion enables better adaptation of the reinforcing member to the outer radius of the belt shaft so that the latter may be designed to be rounder in total when viewed in cross-section.

The retaining portion may be formed, for example, by two integrally connected lands, each of the lands forming one layer.

The two lands may be connected by a bending portion, for example. Especially, the lands may be formed by folding and, resp., bending a planar sheet metal portion.

The hooking portions preferably extend starting from one of the lands and the supporting portion extends starting from the respective other land. This allows better load distribution of the force acting on the reinforcing member and the body via the webbing.

It is also possible, however, that the hooking portions and the supporting portion extend starting from either of the lands.

The retaining lands may extend, for example, from one side of the plane defined by the retaining portion over the same to the other side. When viewed in cross-section, the reinforcing member has an e-shaped cross-section, wherein at the free end of the "e" the supporting portion is provided, while the "closed area" of the "e" forms the retaining portion. The passage window is provided so that webbing wrapped around the retaining portion may extend through the passage window without contacting the supporting portion. This shape of the reinforcing member enables a symmetric load transfer to the body, when viewed in cross-section, so that the punctual load on the body is lower.

For achieving even belter load distribution the hooking portions may be provided with a bearing edge especially stepped in the longitudinal direction.

The flanges of the belt shaft usually are provided with a tooth profile so as to prevent the belt shaft from co-rotating in the case of tensile force acting on the webbing by the tooth profile engaging in a bearing-side toothing. In order to avoid interruption of the toothing by the hooking silt, the hooking portion may be provided with a toothed edge which completes the circumferential toothing on the flange of the body when the reinforcing member is hooked in.

For achieving better catching in the bearing-side toothing said toothed edge may be bent vis-à-vis a plane defined by the hooking portions.

When viewed in section perpendicularly to the longitudinal axis of the reinforcing member, the toothed edge may also be located approximately on the same radius as the supporting portion in this area, which allows to obtain very uniform load transfer to the body.

For achieving the object a belt shaft is further provided comprising a belt shaft body which in the center has a recess and comprising two flanges in each of which a hooking slit is provided, wherein the belt shaft body includes a supporting surface for the supporting portion adjacent to the recess. Said supporting surface is preferably provided on a land interconnecting the two flanges.

The supporting surface may have at least one first partial surface extending in the circumferential direction with respect to the belt shaft axis en which partial surface the supporting portion rests. Preferably said first partial surface is provided on the radial outer surface of the land interconnecting the two flanges. By the extension in the circumferential direction excellent load transfer to the land can be achieved. In particular, lever forces acting on the reinforcing member can be excellently absorbed by an appropriately wide support.

The supporting surface may also have a second partial surface extending radially with respect to the belt shaft axis. Especially, a combination of the first and second partial surfaces is possible.

In accordance with the invention, furthermore a reinforcing member according to the invention is inserted in the hooking slits so that the hooking portion is located in the hooking slit and the supporting portion contacts the supporting surface.

For achieving the object furthermore an end fitting tensioner for a seat belt is provided comprising such belt shaft.

BRIEF DESCRIPTION OF THE DRAWINGS

Further advantages and features will be evident from the following description in connection with the enclosed drawings, wherein.

Figure 1A:
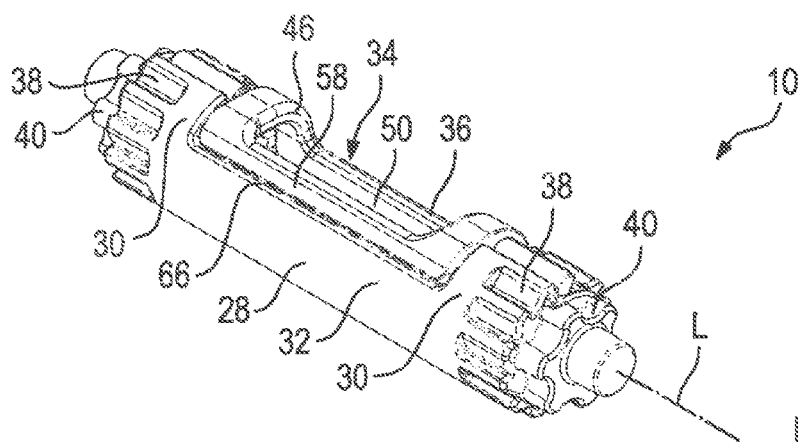
FIGS. 1a to 1c show different views of a belt shaft according to the invention.
Figure 1B:
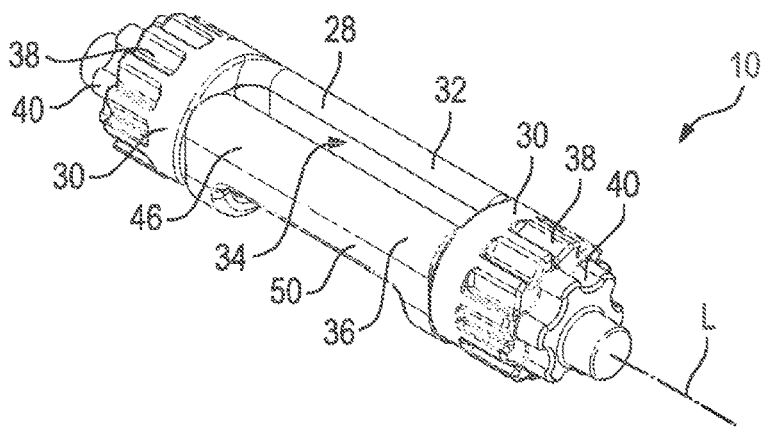
Figure 1C:
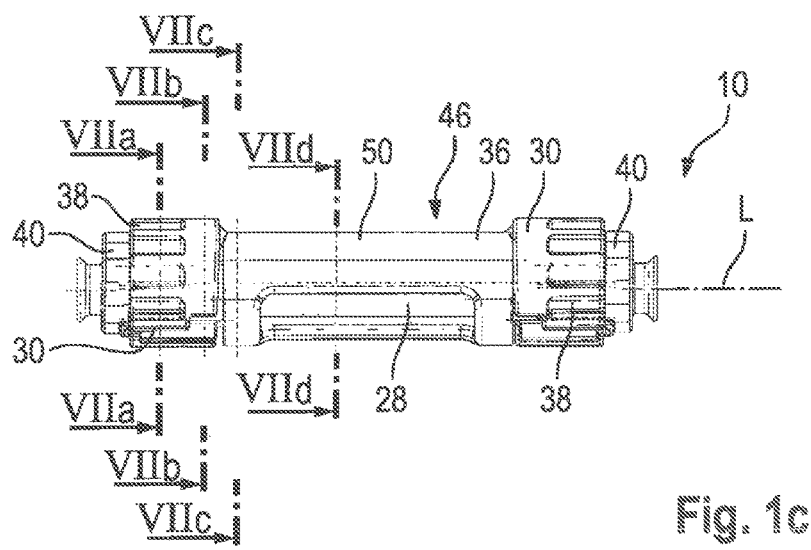
Figure 2A:
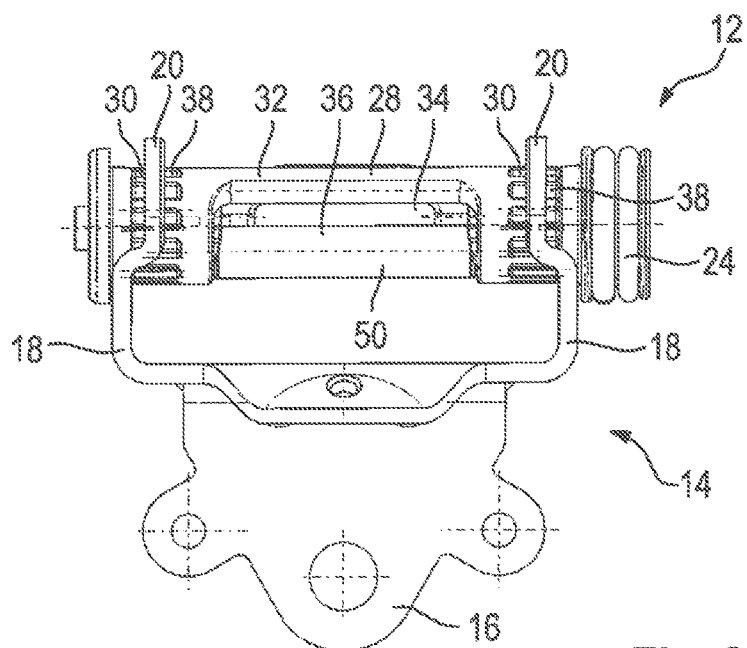
FIG. 2a shows a perspective view of an end fitting tensioner according to the invention.
Figure 2B:
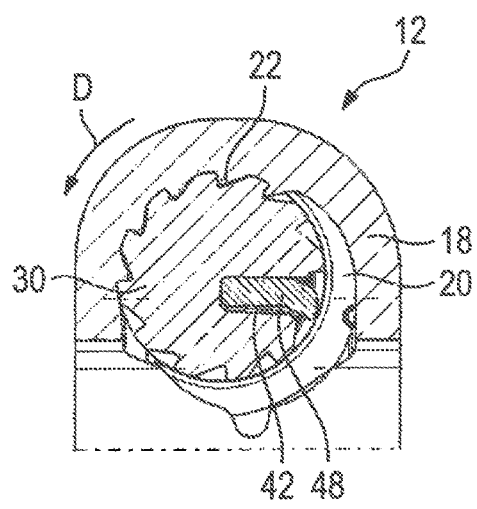
FIGS. 2b and 2c show sectional views of the end fitting tensioner of FIG. 2a in the sectional plane II of FIG. 2a, FIG. 3 shows a perspective view of a reinforcing member of the belt shaft of FIGS. 1a to 1c.
Figure 2C:
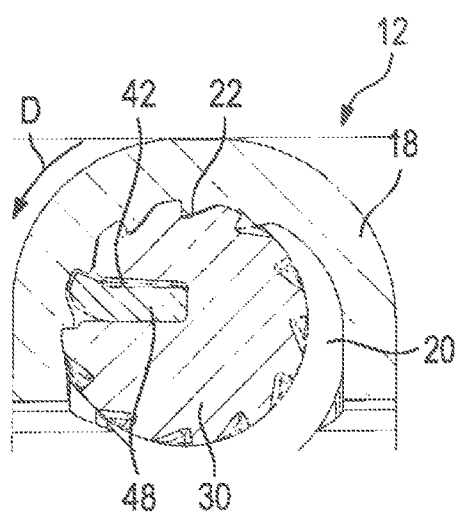

DESCRIPTION in FIGS. 1a to c a belt shaft 10 for an end fitting tensioner 12 of a seat best illustrated in FIGS. 2a to c is shown.

The end fitting tensioner 12 includes a retaining frame 14 having a base plats 16 for mounting the retaining frame 14 fixed to the vehicle as well as two substantially parallel side legs 18 each including a round cutout 20 (see FIGS. 2b and c) for receiving and, resp., bearing the belt shaft 10. At the rim of each of the cutouts 20 a toothing 22 that serves for blocking the belt shaft 10 is provided. As is evident from FIG. 2a, furthermore a tensioning drive 24 (indicated only schematically here) is provided to load the belt shaft 10 in a direction of rotation D for winding webbing 28 (cf. FIGS. 9a and 9b.

As is evident from FIGS. 1a and 1b, the belt shaft 10 includes a belt shaft body 28 being composed of two flanges 30 provided at the axial ends and a land 32 connecting the flanges 30. Between the flanges 30a recess 34 into which a reinforcing member 36 described hereinafter is inserted is provided. The belt shaft body 23 is preferably made from plastic material.

A tooth profile 38 adapted to interact with the toothing 22 at the side legs 18 of the retaining frame 14 is provided on each of the flanges 30. Moreover, a torque transmission profile 40 projecting in the axial direction in which a drive element of the tensioning drive 24 may engage, for example a pulley, is provided.

As can be inferred from FIGS. 2b and c as well as 7a and b, a hooking slit 42 is provided on each flange 30. The hooking silts 42 extend starting from the shell of the flanges 30 on a plane perpendicular to the longitudinal axis L into the flanges 30 in the radial direction, for example, with the hooking slits 42 preferably extending over the entire axial length of the flanges 30.

Figure 3:
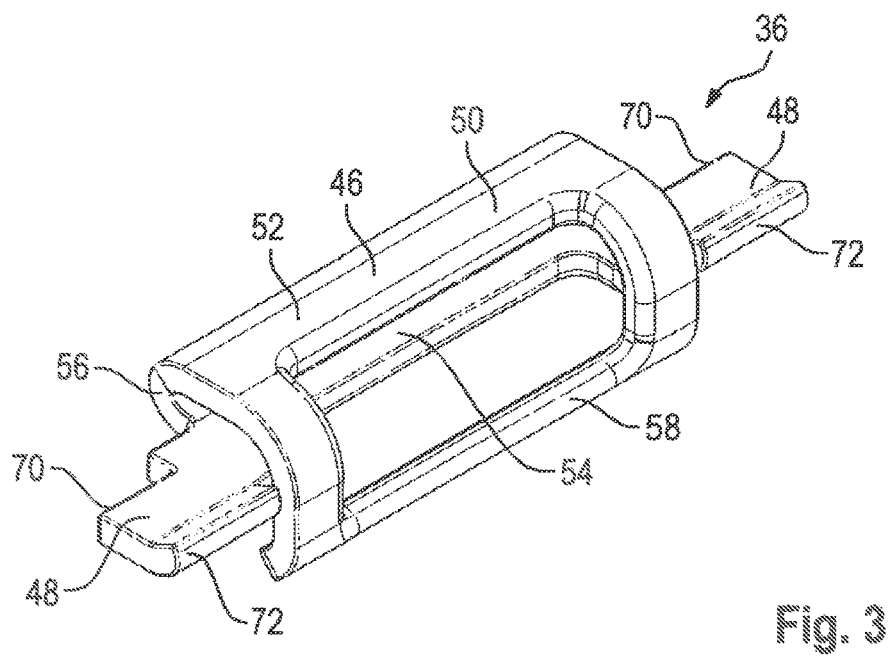
Figure 4:
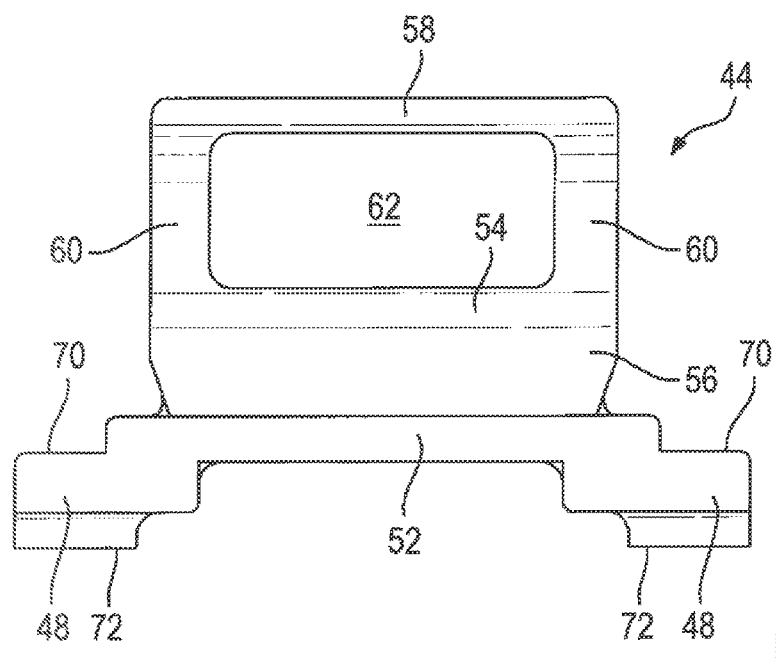
FIG. 4 shows a sheet metal part for manufacturing the reinforcing member of FIG. 3, FIGS. 5a to 5c show different views of the reinforcing member of FIG. 3, FIGS. 6a to 8d show sectional views of the reinforcing member of FIG. 3 in the sectional planes VIa-VId of FIG. 5a, FIGS. 7a to 7d show different sectional views of the bolt shaft in the sectional planes VIIa to VIId of FIG. 1c.

The reinforcing member 36 shown in FIG. 3 is made from a planar sheet metal strip 44 shown in FIG. 4.

The reinforcing member 36 includes a central portion 46 and two hooking portions 48 provided at the longitudinal ends of the central portion 46.

Figure 5A:
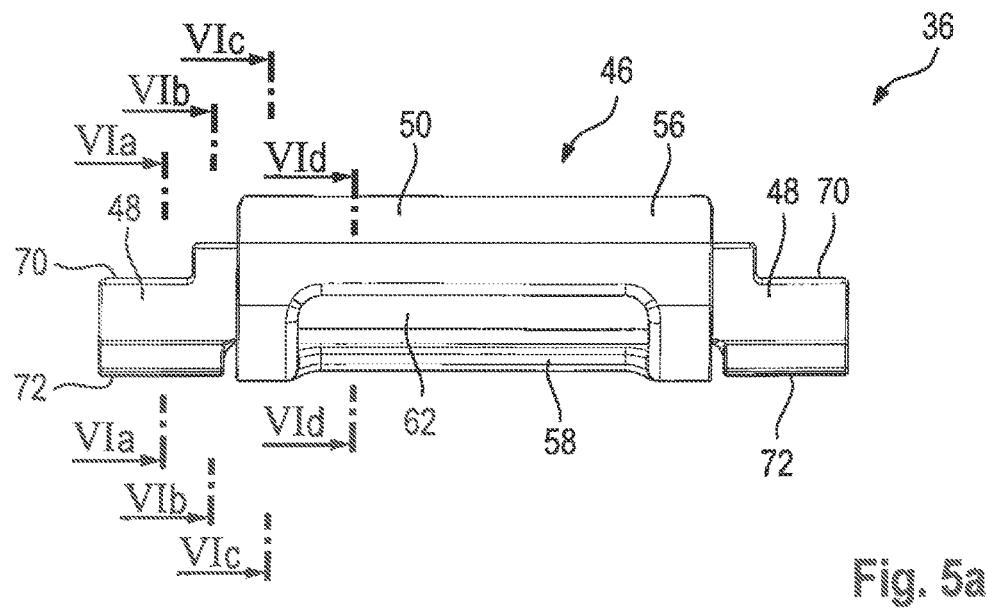
Figure 5B:
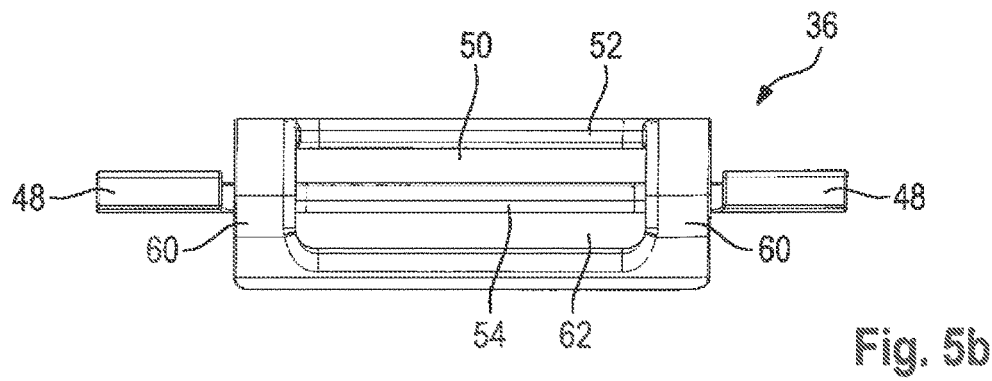
Figure 5C:
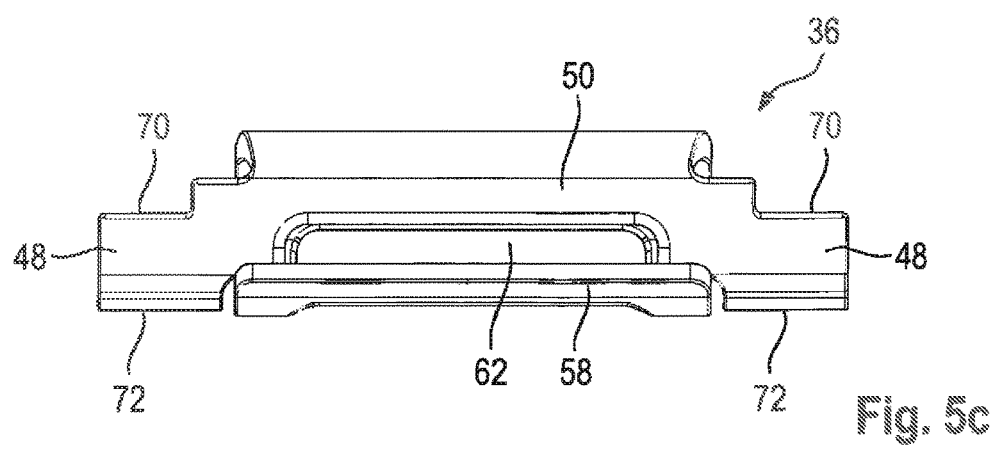

The central portion 46 has a retaining portion 50 which, as is evident from FIGS. 5b and c, is double-layered with each of the layers being formed of a land 52, 54. The lands 52, 54 are interconnected via a bending portion 56 extending in the longitudinal direction L. The retaining portion 50 is formed by folding or bending the sheet metal strip 44.

In addition, the central portion 46 includes a supporting portion 58 extending in the longitudinal direction L and being spaced from the retaining portion which is connected to the retaining portion 50 by two bent retaining lands 60. A passage window 62 is defined by the retaining lands 60, the supporting portion 58 and the retaining portion 50.

Figure 6A:
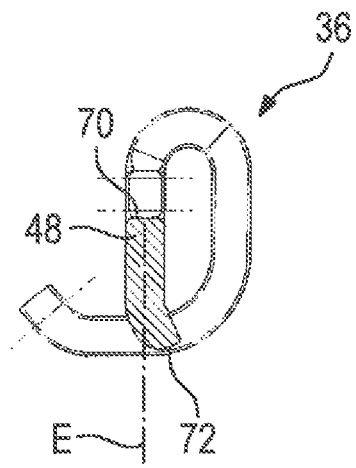
Figure 6B:
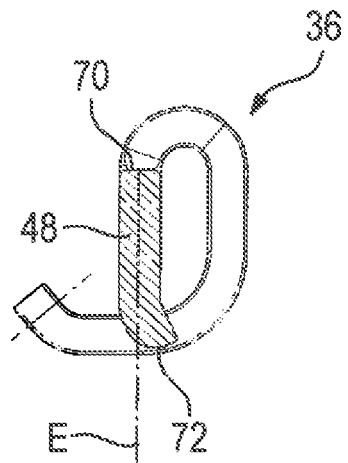
Figure 6C:
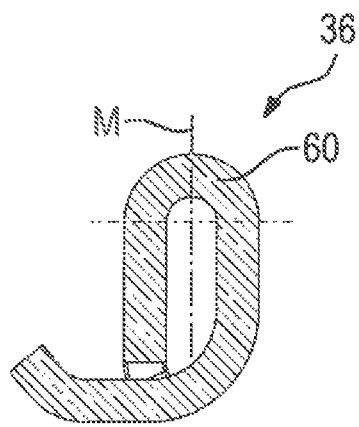
Figure 6D:
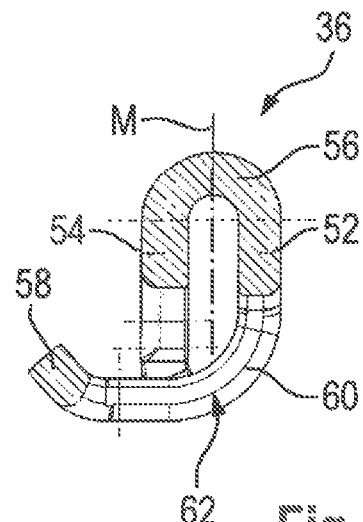

As is visible in FIGS. 3 and 4, the hooking portions 48 are provided on one of the two lands 54 and the supporting portion 58 extends away from the other land 52. A plane M which is plotted in the FIGS. 6c and d is defined by the two lands 52, 54 of the retaining portion 50.

Figure 8:
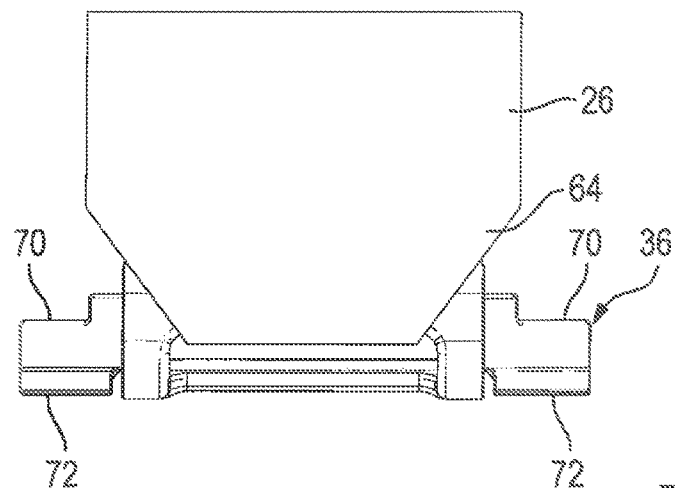
FIG. 8 shows the reinforcing member of FIG. 3 with webbing being inserted.
Figure 9A:
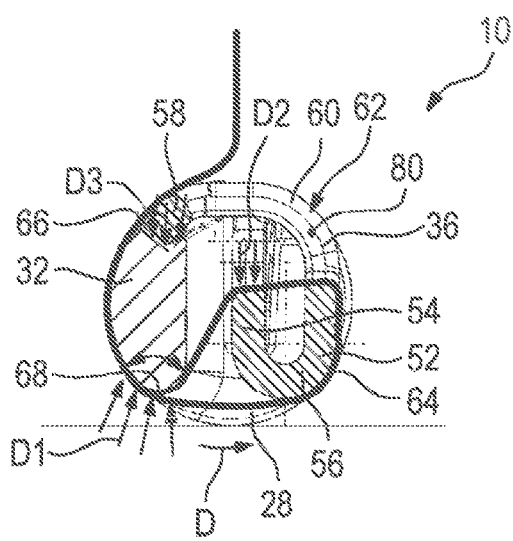
FIGS. 9a and 9b show sectional views of the belt shaft of FIG. 1 with webbing being inserted.
Figure 9B:
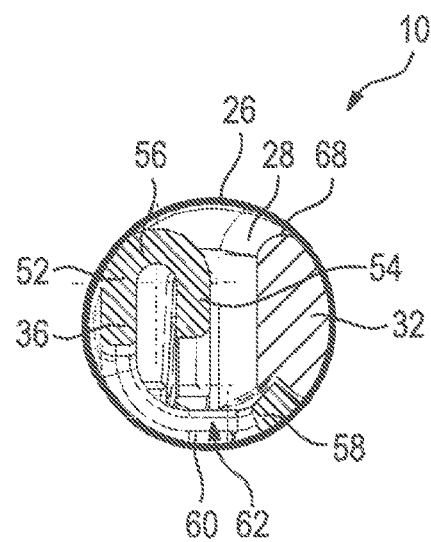

As is visible in FIG. 8 as well as in FIGS. 9a and b, the retaining portion 50 is wrapped by an eye 64 formed by the webbing 26 for mounting. The webbing 26 is laid around the retaining portion 50 so that it extends through the passage window 62 and does not contact the supporting portion 58.

Subsequently the reinforcing member 36 is inserted along with the hooking portions 48 into the hooking slits 42 of the belt shaft body 28 until said hooking portions contact the bottom of the hooking slits 42 (cf. FIGS. 7a and b).

Figure 7A:
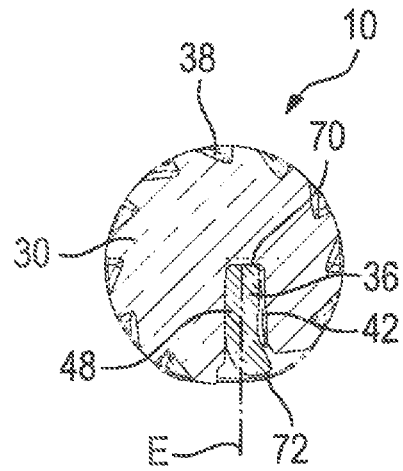
Figure 7B:
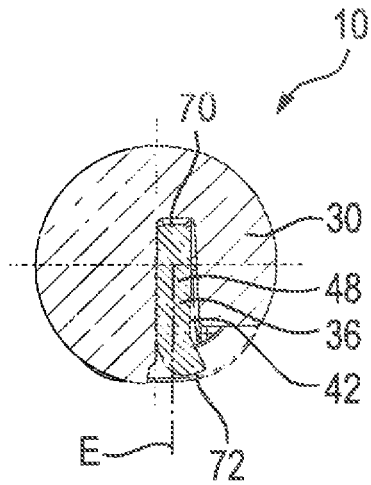
Figure 7C:
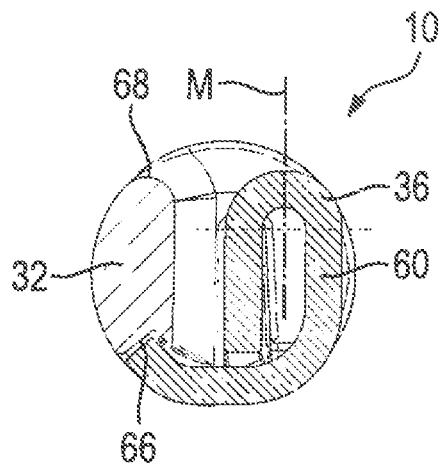
Figure 7D:
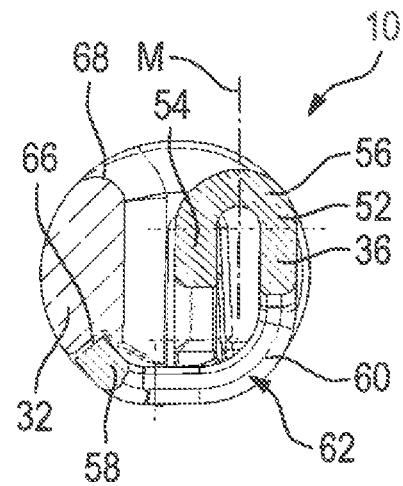

As is evident from FIGS. 7c and d, the supporting portion 58 in this position of the reinforcing member 36 contacts a supporting surface 66 on the land 32 of the belt shaft body 28.

When the belt shaft 10 then is moved in the direction of rotation D so as to wind the webbing 26 onto the belt shaft 10, the webbing 26 first contacts a contact face 68 opposed to the supporting surface 66 on the land 32 when viewed in cross-section. When a tensile force acts on the webbing 26, pressure forces D1 thus act on the contact face 68. At the same time, pressure forces D2 act on the bottom of the hooking slits 42 via the hooking portions 48. In addition, pressure forces D3 act on the supporting surface 66 of the land 32.

Figure 10A:
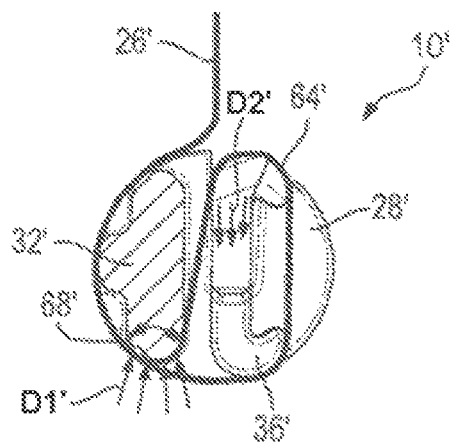
FIGS. 10a and 10b show a state-of-the-art belt shaft in cross-section.
Figure 10B:
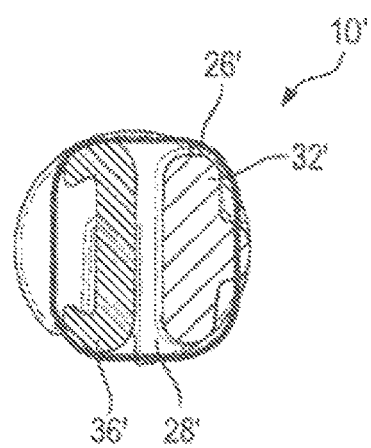
Figure 11A:
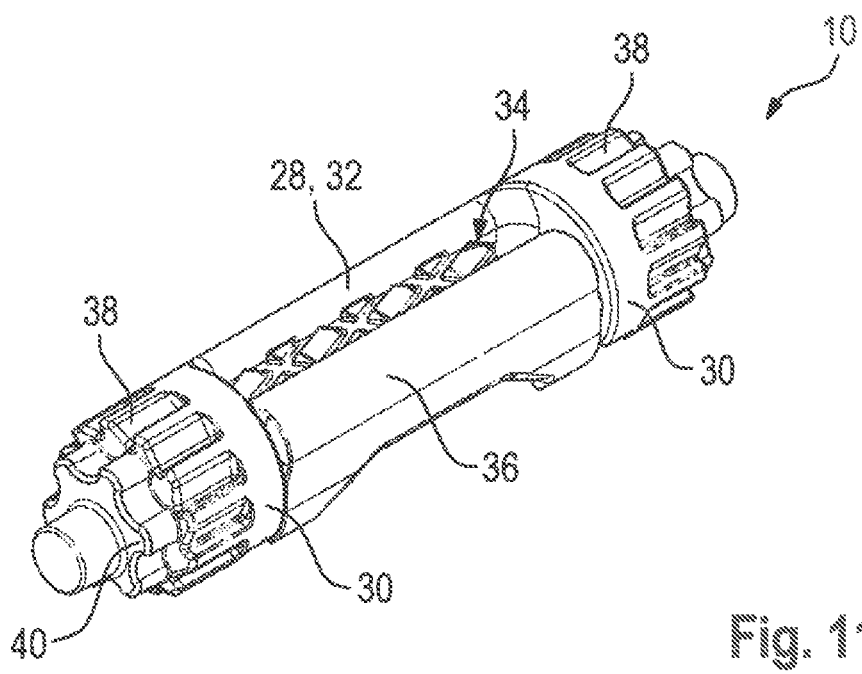
FIGS. 11a to 11e show different views of a second embodiment of a belt shaft according to the invention.
Figure 11B:
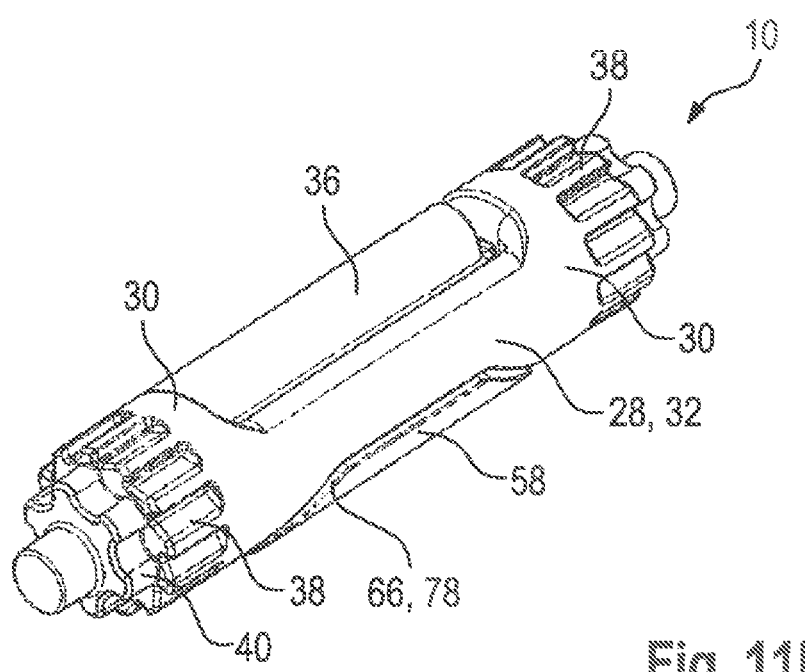
Figure 11C:
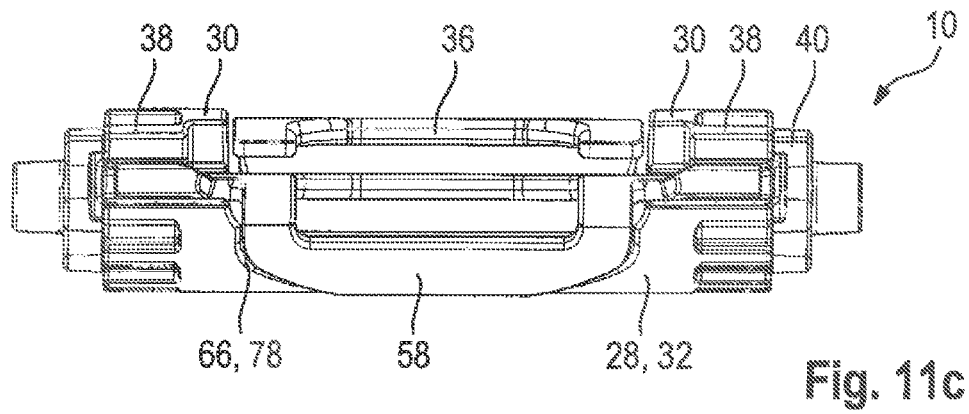
Figure 11D:
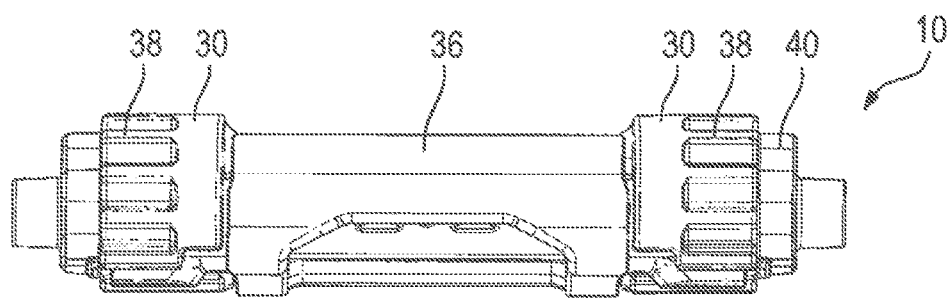
Figure 11E:
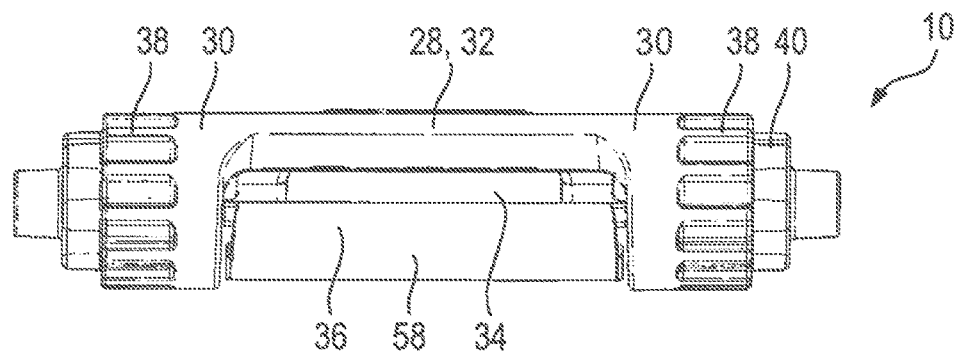
Figure 12:
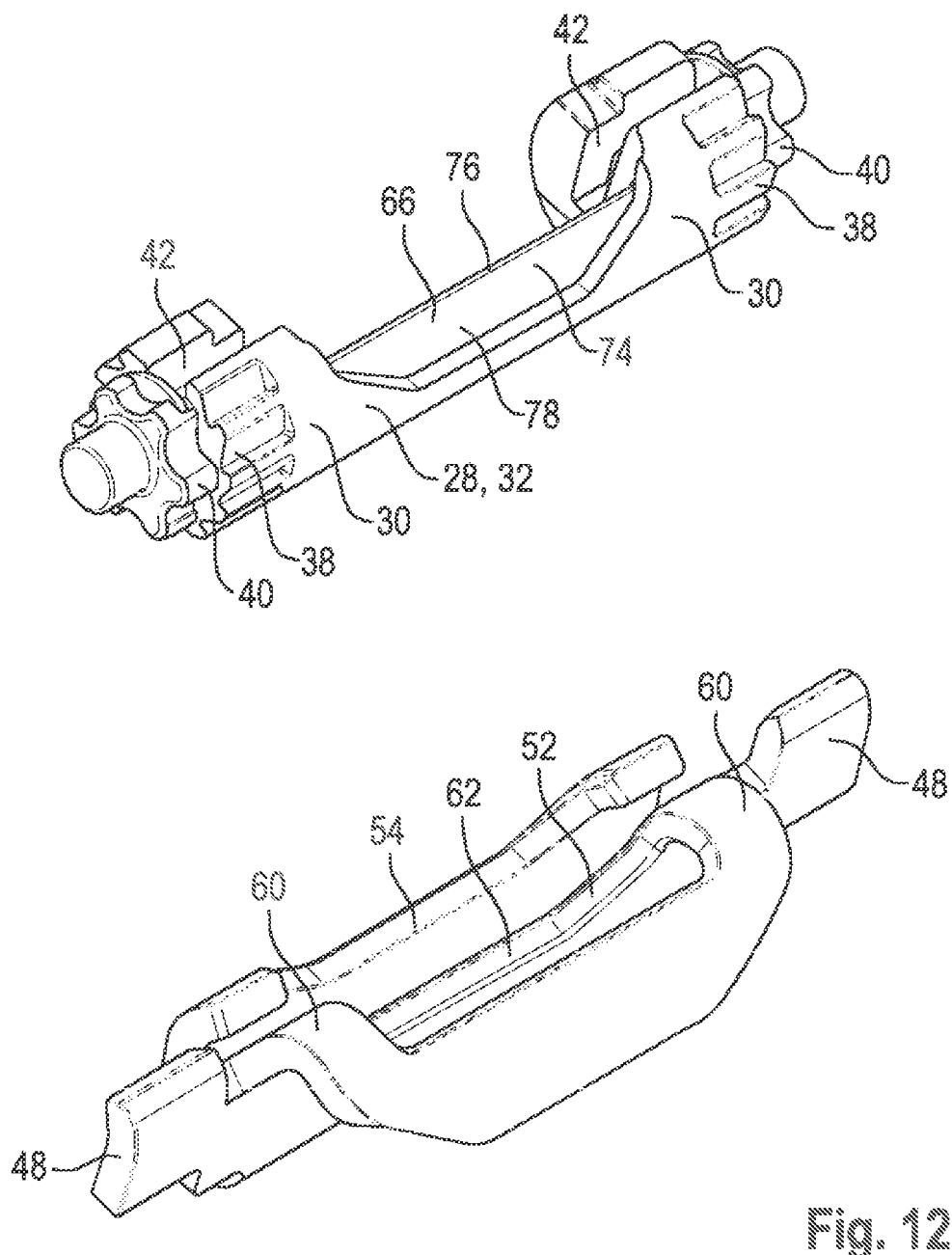
FIG. 12 is an exploded view of the belt shaft of FIGS. 11a to 11e, FIGS. 13a to 13c show different perspective views of the reinforcing member of the belt shaft of FIGS. 11a to 11e, FIGS. 14a to 14c are top views onto the reinforcing member of FIGS. 13a to 13c.

In FIGS. 10a and b the acting pressure forces are shown in comparison in a belt shaft 10' having a conventional reinforcing member 36' without any additional supporting surface 66 or a supporting portion 58, respectively.

In this case, merely pressure forces D1' and D2' are acting, which causes a strongly irregular load of the belt shaft body 28'. Since the reinforcing member 36' does not rest on the land 32', it can be bent by the tensile forces acting on the webbing. In addition, the forces act exclusively on the hooking slits and the contact face 68', thus causing an asymmetric load of the belt shaft body 28' when viewed in cross-section. Furthermore, the pressure forces D1' may cause bending stress of the land 32'.

As is evident from FIG. 9a, the pressure forces D3 acting on the land by the additional support of the reinforcing member 30 via the supporting portion 58 are directed substantially opposite to the pressure forces D1, thus preventing strong bending stress of the land 32. In addition, the forces D1, D2, D3 act on the belt shaft body 28 so that the latter is loaded substantially symmetrically, especially more uniformly so that less deformation of the same will occur.

This more uniform load is achieved by the supporting portion 58 being offset relative to the plane M which is defined by the retaining portion 50. The central portion 50 especially exhibits a substantially e-shaped design, with the supporting portion 58 being provided at the tree end of the "e". The hooking portions 48 are provided at the opposite inner end of said "e".

Especially the retaining lands 60 extend from a first side with respect to the plane M over said plane M to the other side, in this way, very uniform load transfer, when viewed in cross-section, to the belt shaft body 28 is achieved.

Moreover, as the reinforcing member 36 can be adapted better to the outer circumference of the belt shaft 10 due to the double-layered design, a rounder cross-section of the belt shaft 10 is obtained (cf. FIG. 9b as compared to 10b), in this way, fewer imbalances occur during winding of the webbing 26 so that in the case of tensioning a more uniform winding operation is performed.

As is evident from FIGS. 5a and c the bearing edge 70 of the hooking portions 48 is formed to be stepped in the longitudinal direction. The hooking slits 42 are formed to correspond thereto so that the load application to the flanges 30 is performed more uniformly.

Opposite to the bearing edges 70 a toothed edge 72 which is bent vis-à-vis a plane E defined by the hooking portions 48 is provided at each of the hooking portions 48 (cf. FIGS. 7a and b).

As is visible in FIGS. 7a to d said toothed edges 72 are located, when viewed in cross-section perpendicularly to the longitudinal axis L, approximately on the same radius as the supporting portion 58 in this area. Moreover, the toothed edges 72 are located substantially on the same periphery as the tooth profile 38 of the flanges 30. The toothed edge 72 so-to-speak supplements the tooth profile 38 in the area of the hooking slits 42, as can be inferred from FIG. 7a. Thus, the tooth profile 38 is not weakened in the area of these hooking slits 42.

A second embodiment of a belt shaft 10 according to the invention is illustrated in FIGS. 11a to 11e and 12. As is evident especially from FIG. 12, the structure of the belt shaft body 28 substantially corresponds to that of the belt shaft 10 illustrated in FIGS. 1a to 1c.

The supporting surface 66 provided on the land 32 of the belt shaft body 28 includes two partial surfaces 74, 76, however. A first partial surface 74 is provided on the circumferential surface of the land 32 and extends in the circumferential direction. A second partial surface 76 extends substantially in the radial direction. The first partial surface 74 is provided in a recess 78.

The reinforcing member 36 of the belt shaft 10 is shown in detail in FIGS. 13 to 16.

Figure 16:
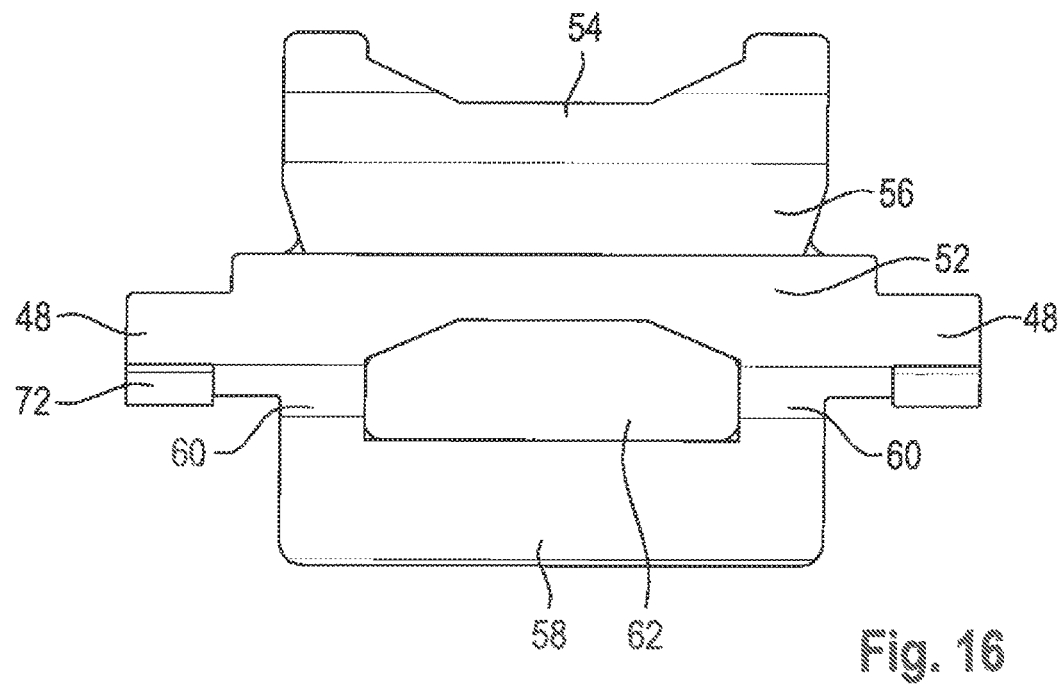
FIG. 16 shows a sheet metal part for manufacturing the reinforcing member of FIGS. 13a to 13c.

As is evident from FIG. 16, the reinforcing member 36 is equally made from a planar sheet metal part.

The reinforcing member 36 also includes a central portion 46, two hooking portions 48 provided at the longitudinal ends of the central portion 46 and a supporting portion 56. The central portion 46 includes a retaining portion 50 equally formed of two lands 52, 54 which are interconnected by a bending portion 56.

As is especially visible from FIG. 18, in this embodiment the hooking portions 48 are provided on the land 52 from which also the supporting portion 58 extends away.

The bending portion 56 is bent so that the land 54 is provided on a first side of the land 52, the lands 60 of the supporting portion 58 are bent so that the supporting portion 58 is located on the opposite side of the land 52. Hence, the reinforcing element 36 is s-shaped, when viewed in cross-section. The supporting portion 58 is curved, when viewed in cross-section, in portions substantially along a circular path the radius of which corresponds to the radius of the belt shaft 10.

Figure 17:
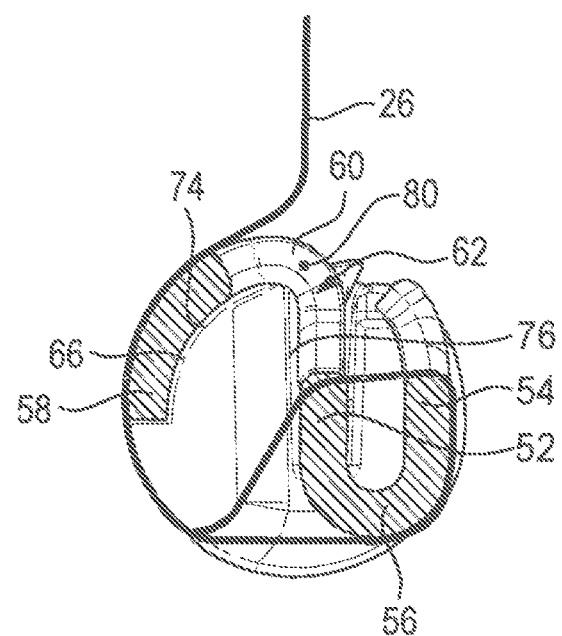
FIG. 17 is a sectional view of the belt shaft of FIGS. 11a to 11e.

As can be inferred from FIG. 17, when the reinforcing member 36 is mounted, the curved supporting portion 58 is adjacent to the belt shaft body 28 with the curved portion fully contacting the first partial surface 74 of the land 32. The retaining lands 60 are adjacent to the second partial surface 76. Hence a larger area of the supporting portion 58 is adjacent to the belt shaft body so that better load transfer to the belt shaft body is possible.

In addition, by the larger contact surface a lever action acting on the reinforcing member 36 is shifted by the pivot point 80 (cf. FIGS. 9a and 17) approaching the supporting surface 66. In both embodiments, the pivot point 80 is closer to the supporting surface 66 than in a conventional belt shaft 10'.

Figure 13A:
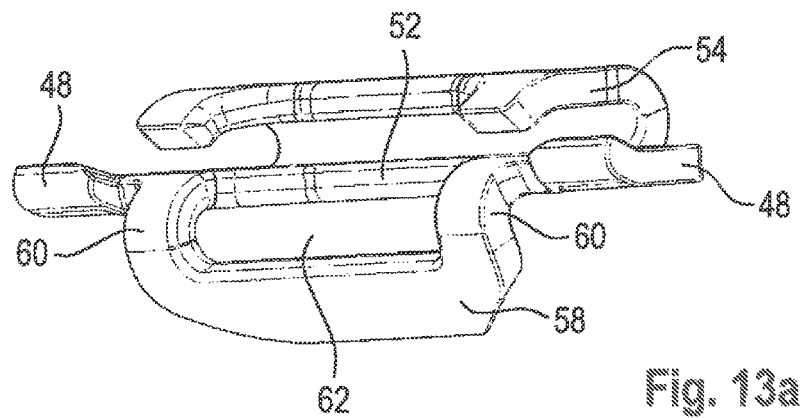
Figure 13B:
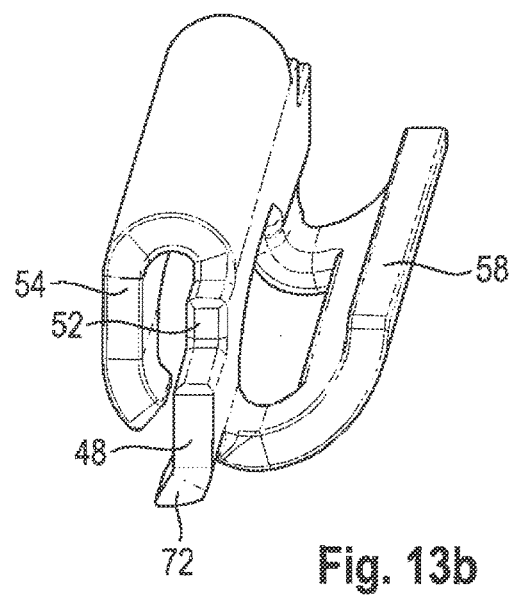
Figure 13C:
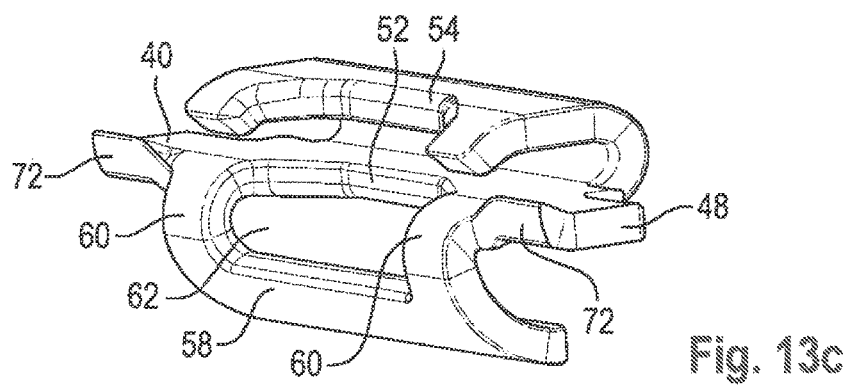
Figure 14A:
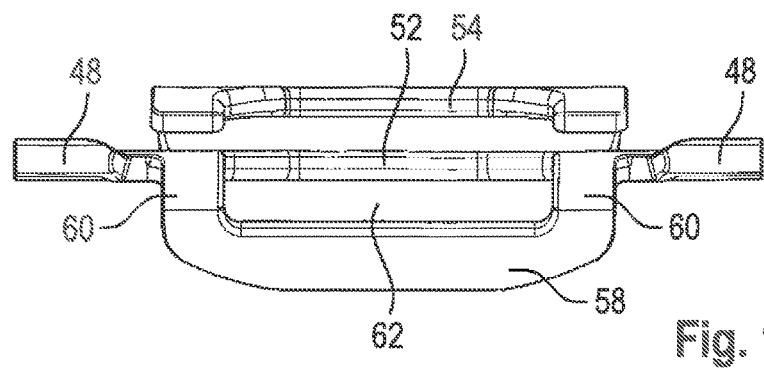
Figure 14B:
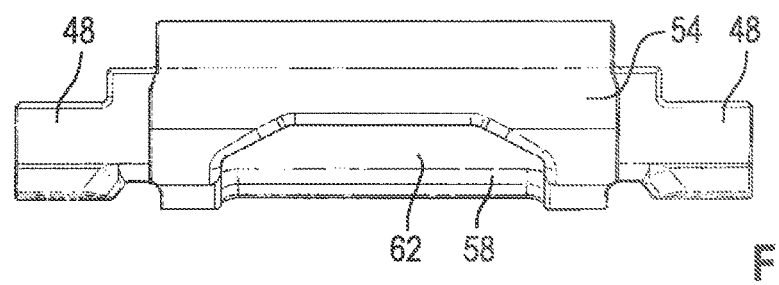
Figure 14C:
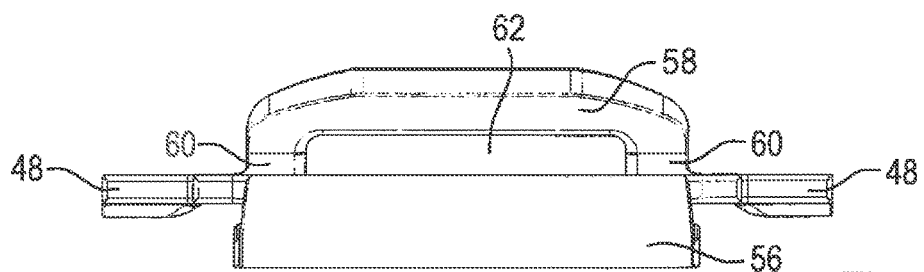
Figure 15:
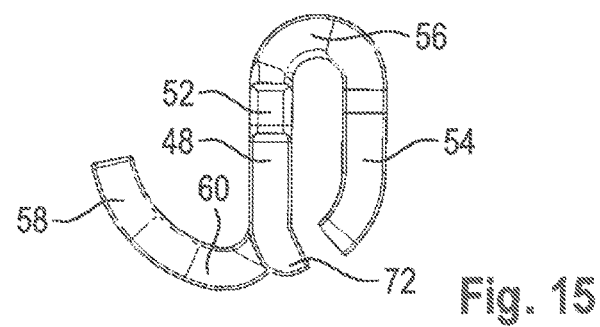
FIG. 15 shows a sectional view across the reinforcing member of FIGS. 13a to 13c.

The reinforcing member 36 shown in FIGS. 13 to 15 moreover offers the advantage that the cross-section (cf. FIG. 16) between the hooking portions 48 and the central portion 46 can be designed to be very wide so that the reinforcing member 36 in total is more stable.

The invention claimed is:

1. A reinforcing member (36) for a belt shaft (10), comprising an elongate central portion (46) and two hooking portions (48) provided at the ends of the central portion (46) and adapted to be hung into a hooking slit of a belt shaft body (28) of a belt shaft (10), wherein the central portion (46) includes a retaining portion (50) adapted to be encompassed by a webbing (26) and a supporting portion (58) extending in the longitudinal direction (L) substantially over the entire central portion (46) and being offset relative to a plane (M) defined by the retaining portion (50), and wherein retaining lands (60) defining a passage window (62) for the webbing (26) extend between the supporting portion (58) and the retaining portion (50).

2. The reinforcing member according to claim 1, wherein the retaining portion (50) is double-layered.

3. The reinforcing member according to claim 2, wherein the retaining portion (50) is formed by two lands (52, 54) integrally connected to each other.

4. The reinforcing member according to claim 3, wherein the two lands (52, 54) are interconnected by a bending portion (56).

5. The reinforcing member according to claim 3, wherein the hooking portions (48) extend starting from one of the lands (52, 54) and the supporting portion (58) extends starting from the other one of the two lands (54, 52).

6. The reinforcing member according to claim 3, wherein the hooking portions (48) and the supporting portion (58) extend starting from either of the lands (52, 54).

7. The reinforcing member according to claim 1, wherein the retaining lands (60) extend from one side of the plane (M) defined by the retaining portion (50) over said plane to the other side.

8. The reinforcing member according to claim 1, wherein the hooking portions (48) are provided with a bearing edge (70) that is stepped in the longitudinal direction (L).

9. The reinforcing member according to claim 1, wherein the hooking portions (48) are provided with a toothed edge (72).

10. The reinforcing member according to claim 9, wherein the toothed edges (72) are bent vis-à-vis a plane (E) defined by the hooking portions (48).

11. The reinforcing member according to claim 9, wherein the toothed edge (72), when viewed in a section perpendicularly to the longitudinal axis (L) of the reinforcing member (36), is located approximately on the same radius as the supporting portion (58) in this area.

12. A belt shaft (10) comprising a belt shaft body (28) and a reinforcing member according to claim 1, the belt shaft body (28) centrally having a recess (34) and comprising two flanges (30) in each of which a hooking slit (42) is provided, wherein the belt shaft body (28) includes a supporting surface (66) for the supporting portion (58) of the reinforcing member (36) adjacent to the recess (34).

13. The belt shaft according to claim 12, wherein the supporting surface includes at least a first partial surface extending in the circumferential direction relative to the belt shaft axis.

14. The belt shaft according to claim 12, wherein the supporting surface includes at least a second partial surface extending radially relative to the belt shaft axis.

15. The belt shaft according to claim 12, wherein the reinforcing member (36) is inserted in the recess (34) so that the hooking portions (48) are located in the hooking slits (42) and the supporting portion (58) is adjacent to the supporting surface (66).

16. An end fitting tensioner (12) for a seat belt, comprising a belt shaft according to claim 15.

* * * * *